United States Patent

Janik et al.

[11] Patent Number: 5,915,926
[45] Date of Patent: Jun. 29, 1999

[54] LIFT PUMP FOR FILTER MODULE

[75] Inventors: Leon P. Janik, Suffield; Michael J. Williams, Glastonbury, both of Conn.

[73] Assignee: Stanadyne Automotive Corp., Windsor, Conn.

[21] Appl. No.: 08/634,812

[22] Filed: Apr. 19, 1996

[51] Int. Cl.⁶ .................................................. F04B 49/06
[52] U.S. Cl. ........................... 417/44.2; 417/53; 417/313
[58] Field of Search ............................. 417/44.2, 313, 417/53; 210/416.4, 96.1

[56] References Cited

U.S. PATENT DOCUMENTS

| | | | |
|---|---|---|---|
| 4,309,155 | 1/1982 | Heinz et al. | 417/360 |
| 4,322,290 | 3/1982 | Carl | 210/136 |
| 4,551,071 | 11/1985 | Ohgaki et al. | 417/313 |
| 4,657,040 | 4/1987 | Torres | 210/136 |
| 4,662,825 | 5/1987 | Djordjevic | 417/206 |
| 5,167,837 | 12/1992 | Snodgrass et al. | 417/53 |
| 5,203,994 | 4/1993 | Janik | 210/232 |
| 5,207,898 | 5/1993 | Hodgkins | 210/136 |
| 5,236,579 | 8/1993 | Janik et al. | 210/94 |
| 5,360,322 | 11/1994 | Henein | 417/313 |
| 5,474,676 | 12/1995 | Janik et al. | 210/249 |
| 5,511,957 | 4/1996 | Tuckey et al. | 417/313 |
| 5,578,221 | 11/1996 | Janik | 210/416.4 |
| 5,614,091 | 3/1997 | Janik et al. | 210/249 |

*Primary Examiner*—Charles G. Freay
*Assistant Examiner*—Cheryl J. Tyler
*Attorney, Agent, or Firm*—Alix, Yale & Ristas, LLP

[57] ABSTRACT

A fuel filter assembly of modular form is adapted to incorporate a lift pump or an automatic primer. The lift pump is mounted to the filter base by means of a lock ring. Fuel supplied to the filter base inlet is supplied to a rotary vane-type or gerotor pump which may be electrically activated from the vehicle console or a location remote from the fuel filter assembly. The lift pump regulates the fuel pressure to provide a sufficient fuel flow through the supply system and the filter for ultimate delivery to the fuel injection pump or engine. The pump/filter flow sequence is bi-directional and may be selected by the angular position of an adapter.

27 Claims, 10 Drawing Sheets

LIFT PUMP FOR FILTER MODULE

BACKGROUND OF THE INVENTION

This invention relates generally to fuel filters which are employed in connection with internal combustion engines. More particularly, the present invention relates to fuel filters having a replaceable cartridge for removing foreign particles and for separating water from the fuel supply system of an internal combustion engine and to fuel supply systems which may require pressurization to transfer the fuel to the fuel filter.

Conventionally, fuel filters, of the type to which the invention relates, employ a disposable filter cartridge which is replaced at pre-established intervals of filter usage. The fuel filter is incorporated into the fuel supply system to the engine. The supply system may incorporate a fuel injection pump. For certain applications, it may be required to prime the filter assembly when a cartridge is replaced or when the engine is initially started. In some applications, because of the disposition of the fuel reservoir and the fuel filter or other characteristics of the fuel supply system, it may be desirable or required to impose a supply pressure to transfer or direct the fuel through the fuel filter assembly. A given fuel filter assembly configuration can have application in systems where neither a hand primer nor an automatic lift pump may be required or in applications where either one or both of such devices may be required.

For some applications it may be desirable to position the filter before the pump, such as, for example, when the filter functions as a primary filter. For other applications it may be desirable to reverse the flow through the filter, i.e., for annular filter elements to accomplish the filtering by means of a flow path flowing from the exterior to the interior. It is highly desirable for most applications to regulate the pressure, particularly to prevent excessive pressure loads on the filter element and to satisfy pressure requirements for the injection pump.

SUMMARY OF THE INVENTION

Briefly stated, the invention in a preferred form is a modular fuel filter assembly which comprises a base having an inlet and an outlet. A replaceable filter cartridge is received by the base. The base and cartridge are configured to provide fluid communication with the inlet and the outlet. A pump is mounted to the base in opposite relationship to the cartridge. The pump fluidically communicates with the fluid path in the base for pumping fuel supplied to the inlet through the cartridge filter to the outlet.

The pump has a housing which encloses the pump. A lock ring threadably mounts to the base to secure the housing. The pump preferably is a vane-type pump or gerotor pump. Pressure is sensed within the pump module of the filter assembly, and the pump operation may be controlled in response to the pressure. In one embodiment, a spring and an inductance circuit responsive to the position of the spring are employed to control the operation of the pump. A by-pass valve may be provided for by-passing the pump when the fluid pressure exceeds a pre-established threshold pressure. The pump is electrically powered and may be activated by a switch remote from the filter assembly.

In one embodiment the flow path is sequentially defined by an adapter. In one angular position, the fluid is pressurized by a pump and then passed through the filter. In a second angular position, the fluid is filtered prior to pressurization by the pump. A pressure regulator may also be mounted in a bore of the adapter.

The invention also comprises a method for providing a transfer pressure to supply fuel from a fuel reservoir to a fuel filter assembly which has an inlet, an outlet and a filter. The method comprises mounting a pump to the filter assembly and supplying fuel introduced at the filter header inlet port to the pump. The pump pressurizes the fuel and forces the pressurized fuel through the filter to the outlet. Fuel is diverted from the pump when the pressure exceeds a pre-established threshold. The operation of the pump may be automatically controlled in response to the sensed pressure. The pump may also be activated from a location remote from the filter assembly.

An object of the invention is to provide a new and improved apparatus and method for automatically implementing a fuel lift in a fuel supply system.

Another object of the invention is to provide a new and improved modular filter assembly and lift pump which may be optionally mounted to the assembly.

A further object of the invention is to provide a new and improved fuel filter assembly which efficiently incorporates a lift pump for supplying fuel to the filter.

A further object of the invention is to provide a new and improved modular filter assembly which may be relatively easily configured for selective bi-directional sequential flow through the pump and filter element.

Other objects and advantages of the invention will become apparent from the specification and the drawings.

DETAILED DESCRIPTION OF THE PREFERRED EMBODIMENTS

Figure 1:
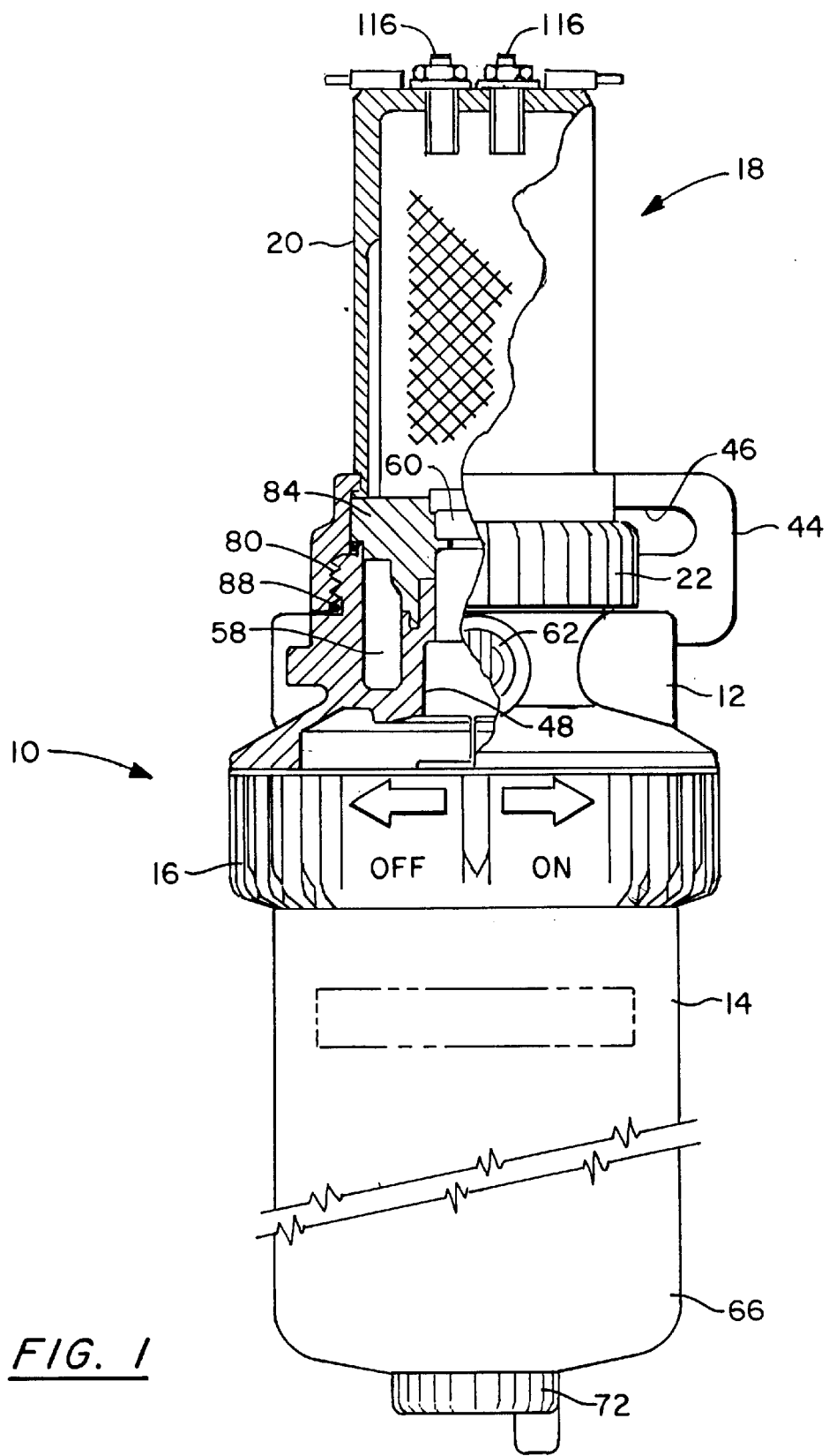
FIG. 1 is a frontal view, partly broken away and partly in section with portions removed, illustrating a modular fuel filter assembly incorporating a lift pump in accordance with the present invention.

With reference to the drawings wherein like numerals represent like parts throughout the several figures, a representative modular fuel filter assembly which optionally incorporates a lift pump in accordance with the present invention is generally designated by the numeral 10. Fuel filter assembly 10 comprises a base 12 and a disposable filter cartridge 14 which is secured to the base by means of a retaining ring or collar 16. A lift pump unit 18 is mounted to the base opposite the cartridge 14 and secured by means of a lock ring 22.

Figure 2:
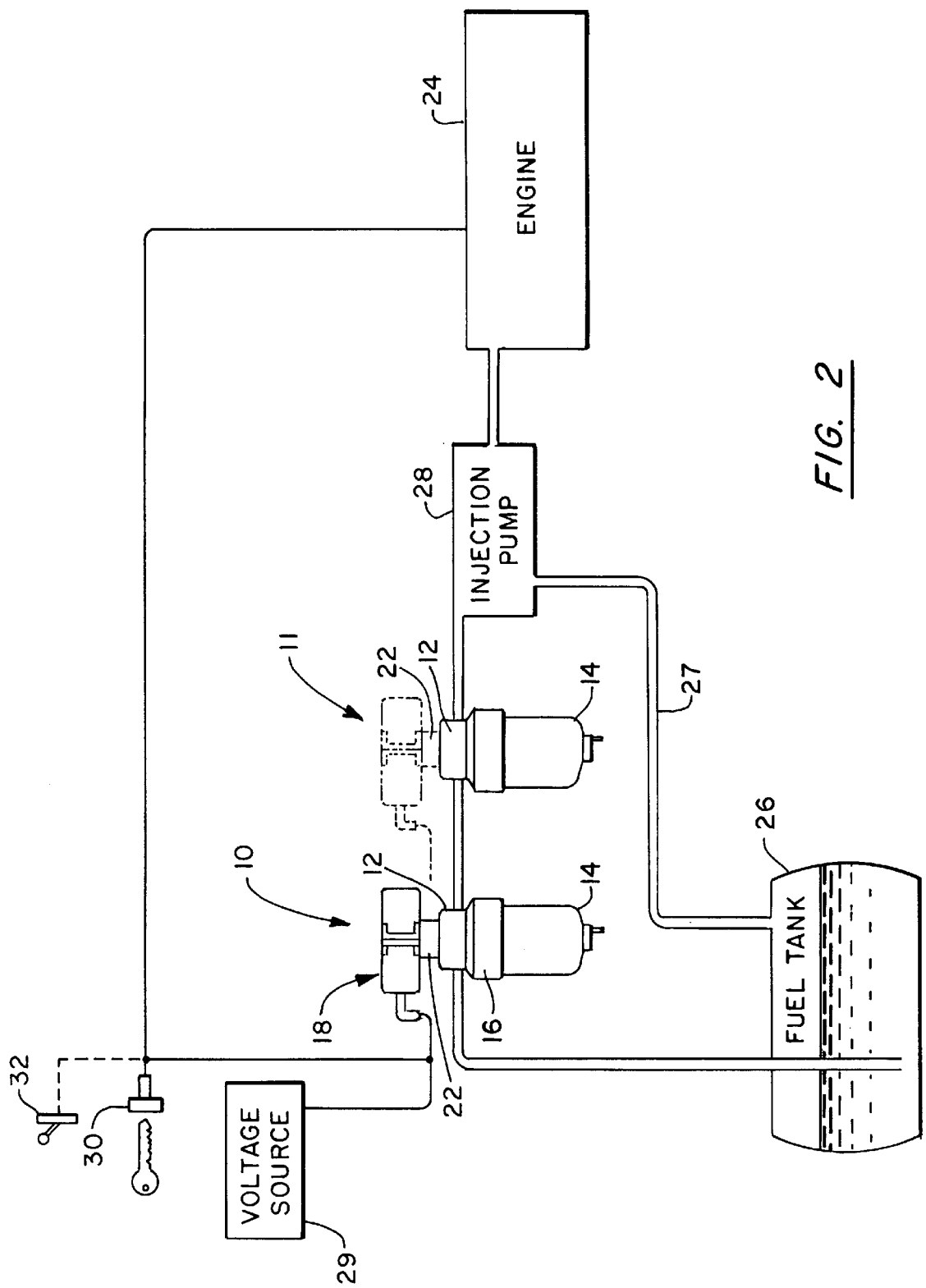
FIG. 2 is a schematic view of a fuel supply system for an internal combustion engine, including a fuel filter and a lift pump system, in accordance with the present invention.

With reference to FIG. 2, the fuel filter assembly 10 is especially suitable for incorporation into the fuel supply system for an internal combustion engine 24, such as a diesel engine, to filter particulate material and remove water from the fuel supply to the engine. The pump unit 18 comprises an electric pump 20 (FIG. 3) which functions to supply a steady supply of fuel to the fuel filter assembly 10 from the fuel reservoir 26 at the low pressure side of the fuel injection pump 28. The lift pump 20 is electrically powered by a voltage source 29 which may be of conventional form. In some embodiments the lift pump 20 is activated by the ignition switch 30 of the engine 24 or a specific switch 32 on the vehicle cab console. Switch 32, for example, may be responsive to a threshold oil pressure. The pump 20 may operate concurrently with the operation of the associated engine 24.

Figure 8:
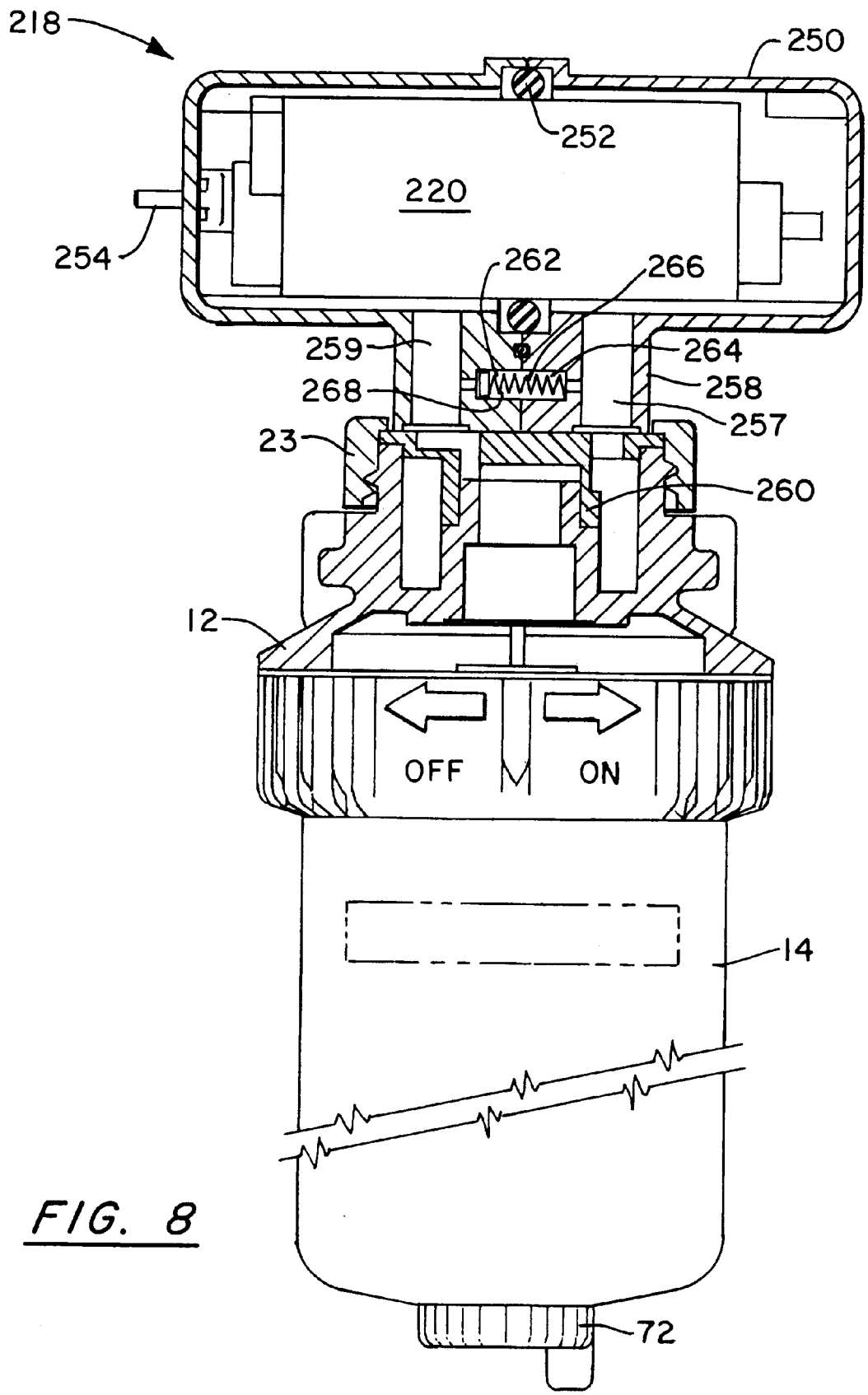
FIG. 8 is an elevational view, partly broken away and partly in section, illustrating a third embodiment of the filter assembly and lift pump in accordance with the present invention.
Figure 9:
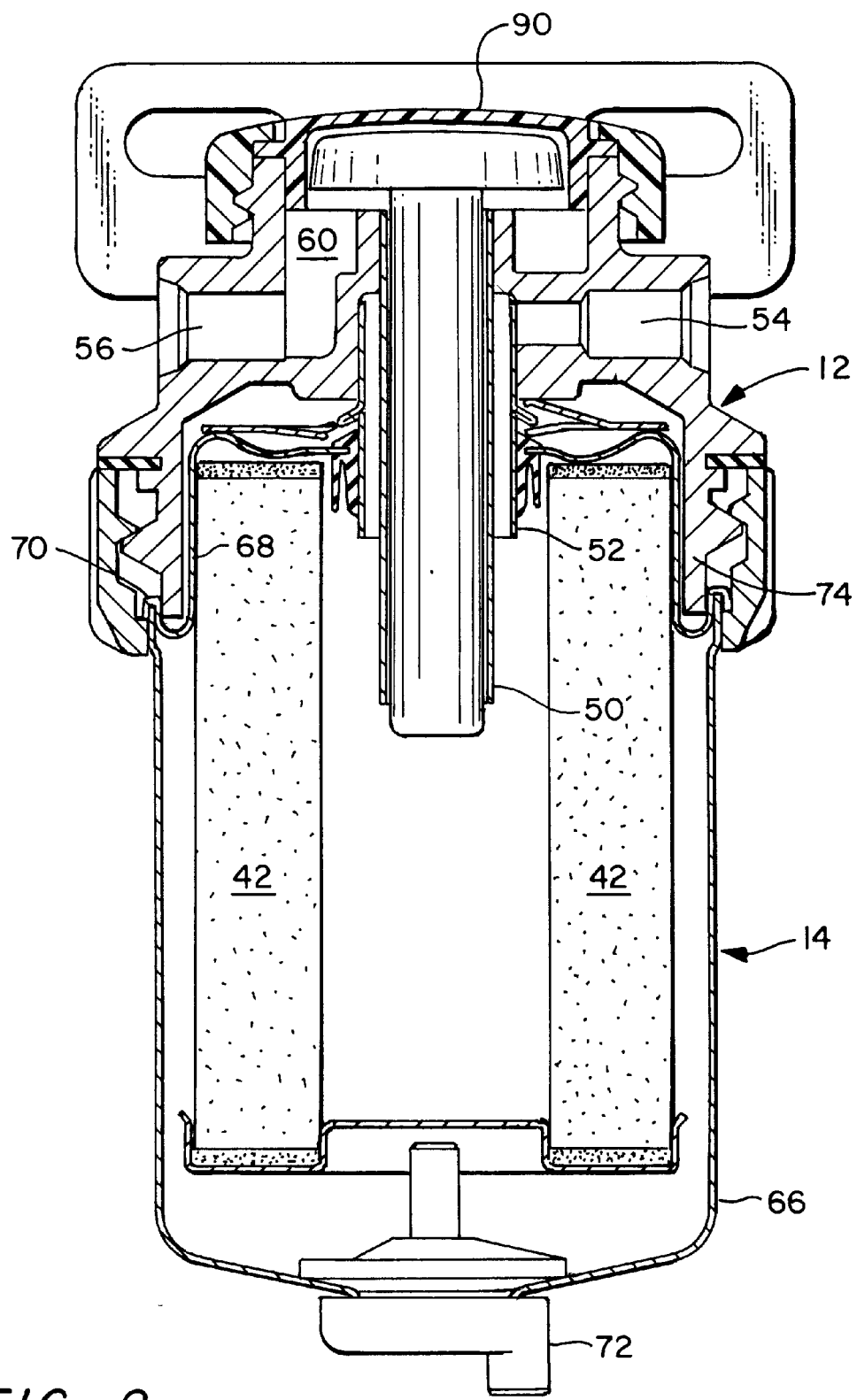
FIG. 9 is a sectional view of a cap assembly option for the fuel filter assemblies of FIGS. 1, 7 and 8.

The filter assembly embodiments, as will be described below, are preferably of a modular form which may optionally mount the lift pump 20 (FIG. 1) or an alternative pump 120 (FIG. 7), 220 (FIG. 8), 320 (FIG. 10) or may be configured without a pump (FIG. 9). For applications where the fuel reservoir outlet is disposed below the fuel filter or there is otherwise insufficient pressure to supply fuel to the filter assembly, the lift pump 20, 120, 220, 320 may function in a controlled, automatic or semi-automatic fashion to supply sufficient pressure to the fuel supply system at the low pressure side of the fuel injection pump. The pumps 20, 120, 220 may also be employed in applications, such as diesel engines having cam-operated unit injectors, where the fuel injection pump is not required. A return line 27 typically returns fuel from the fuel injection pump 28 back to the fuel reservoir 26.

The fuel filter assembly 10 functions as a primary filter. The invention also has applicability in connection with a secondary filter assembly 11 wherein the pump/filter sequence may or may not be reversed as will be further described below or a pump unit may not be required.

The filter cartridge 14 houses a filter 42 (FIG. 9) which has a defined useful life. The cartridge is periodically replaced with a compatible replacement cartridge when the filtering qualities have been sufficiently degraded. The illustrated filter assembly is an inverted-type filter assembly wherein the cartridge 14 is suspended generally below the base or header 12. The cartridge 14 may contain a dual stage or other type filtering system which generally functions to remove particulate matter from the fuel line and optionally to separate water from the fuel. In some embodiments, the orientation of the cartridge 14 and the lift pump unit 18 may be inverted or positioned in various other angular orientations defined by the dimensional constraints of the engine compartment.

Figure 7:
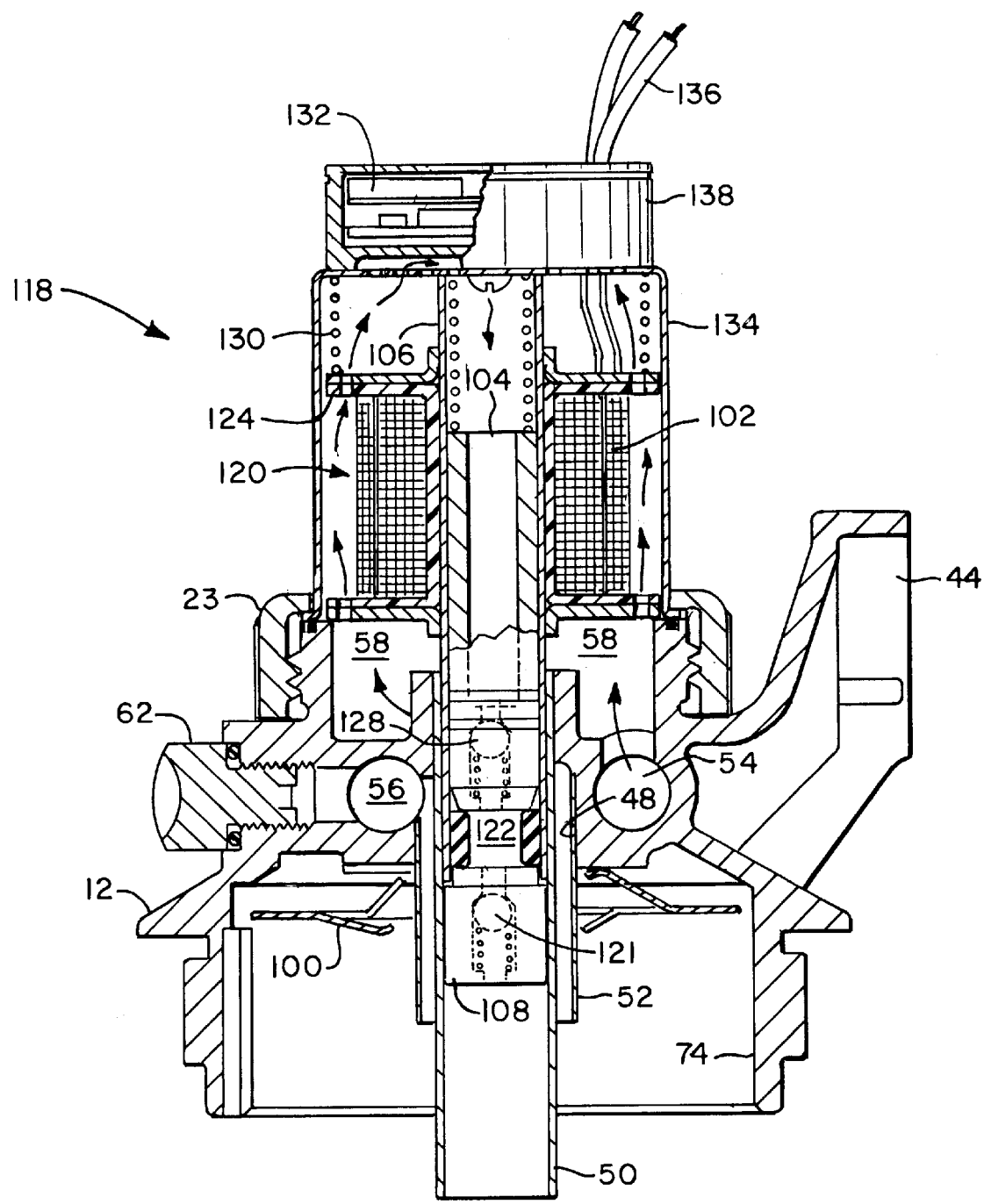
FIG. 7 is a fragmentary elevational view, partly broken away and partly in section, illustrating a second embodiment of the filter assembly base and lift pump in accordance with the present invention.

The base or header 12 is preferably a cast member, which includes a metal cast formed mounting bracket 44. The bracket 44 has one or more slots 46 to facilitate mounting the base to the header or other suitable support structure adjacent an internal combustion engine. For the illustrated embodiment of FIG. 3, the lower portion of the base 12 is an inverted quasi cup-like member which has a central stepped axial bore 48. A conduit or sleeve 50 is received at one end of the upper reduced portion of the base. The lower segment of the stepped bore has been enlarged diametrally to receive a second sleeve or conduit 52. The conduits 50 and 52 are disposed generally in concentric relationship and provide for generally axial fluid communication between the cartridge, the base and the pump as will be further described below. The base further includes a fuel inlet passage 54 and a fuel outlet passage 56 (FIG. 7). An annular passage 51 disposed between the conduits 50 and 52 provides communication with the outlet passage 56. The inlet passage 54 communicates with the passage defined by conduit 50 via an upper axial connecting passage 60 and a flow path through the lift pump unit as will be further described below. The base may also include an air vent 62 threaded in the side of the base for venting trapped air.

The disposable filter cartridge 14 comprises a canister-like housing formed by a pair of cooperative cup-like sections 66 and 68 which are joined along a circumferential roll seam 70 (FIG. 9). The lower larger section 66 includes an axial opening which receives a drain cock 72. The drain cock 72 is employed for manually draining water from the cartridge. The filter element 42, preferably having a continuous fan-shaped pleated form, axially extends into the enlarged can section 66 for single filter element embodiments as illustrated in the drawings. The flow path normally flows radially outwardly through the element 42. However, in some applications, such as described for the FIG. 11 configuration below, the flow path is reversed.

A threaded surface 76 (FIG. 3) at the lower peripheral portion of the base is configured for threaded engagement with the retaining collar 16 and for securing the disposable cartridge to the base. A lower circumferential lip receives a dust seal (not illustrated) which is engaged by the top annular edge of a retainer collar 16. The lower portion of the base has a generally cylindrical surface 74 (FIGS. 3, 7 and 9) which defines an upper receiving cavity for an upper portion of the replaceable filter cartridge.

With reference to FIG. 7, a spring washer 100, having an inscribed star-like configuration and a central opening dimensioned to accommodate the conduit 52, is retained by a ring or by a crimp in the conduit. The spring washer cooperates with the retainer ring and the base threaded surface to releasably mount the cartridge to the base such as described in U.S. Pat. No. 5,203,994 which is assigned to the assignee of the present invention and the disclosure of which is incorporated herein by reference.

Figure 3:
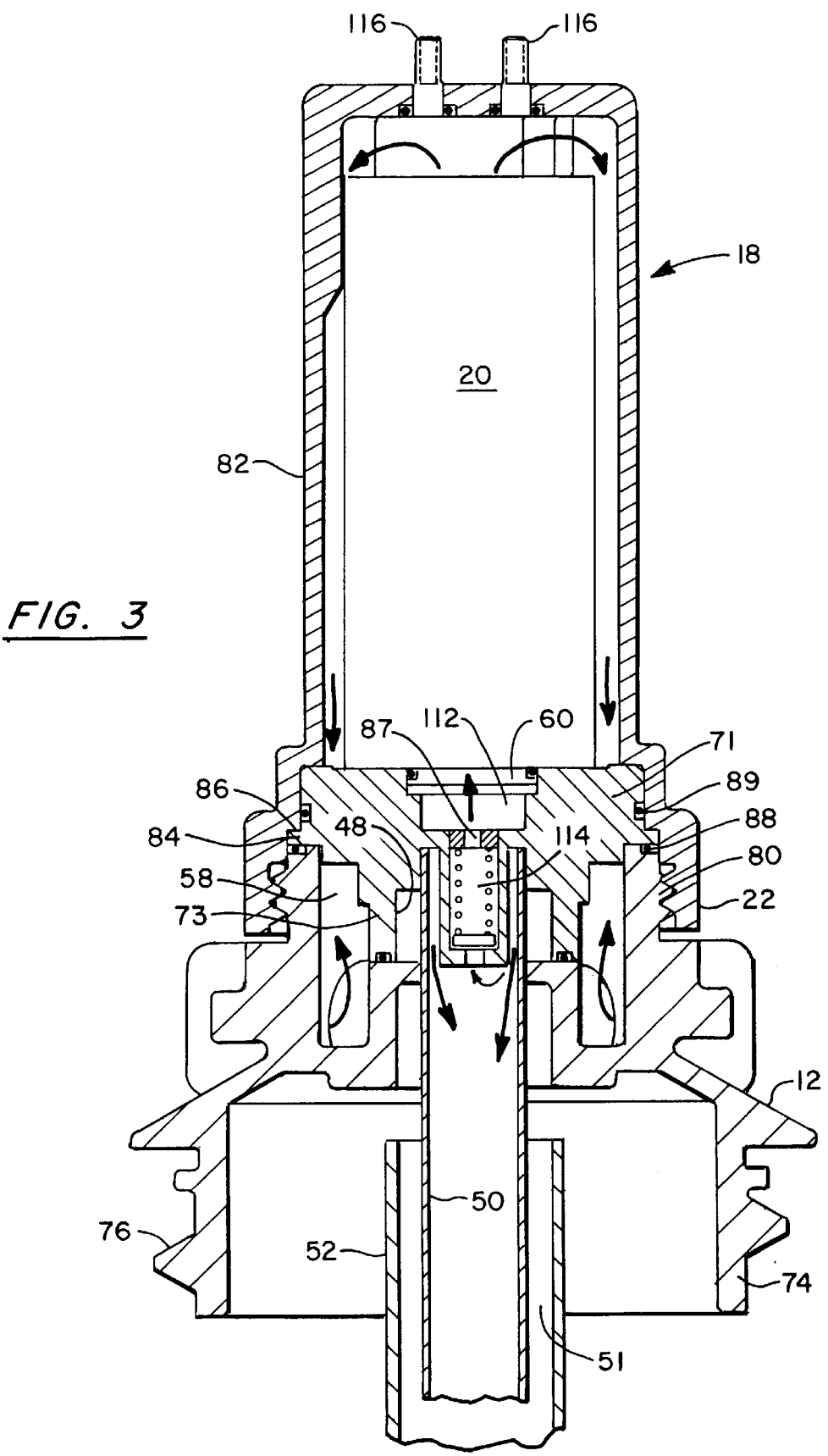
FIG. 3 is an enlarged fragmentary sectional view, partly in schematic, of the fuel filter assembly base and lift pump of FIG. 1.

With reference to FIGS. 1 and 3, an upper cylindrical portion of the base has a peripheral threaded surface 80. The threaded surface receives the lock ring 22 which secures the lift pump unit 18 to the base. The lift pump has a cylindrical housing 82 having a closed outer end. The lock ring 22 may integrally connect at an open end of the housing. The lock ring includes an inward shoulder 86 which engages an adapter rim 84 to compressively seal against a seal ring 88 to fluidically seal the lift pump with the base. A second seal ring 89 may also be provided. A pair of terminals 116 project through the top end of the housing.

The lift pump 20 is an in-line roller vane-type pump which is generally centrally disposed in the housing. The pump 20 is a positive displacement pump which typically pressurizes the fuel to 10 p.s.i. and has a capacity of 40 gallons per hour. The flow path through the pump unit is illustrated by the arrows in FIG. 3. After the fuel enters the filter assembly through inlet 54, the fuel flows to the lift pump 20 where it is pressurized and returned to the filter base or header.

Figure 5:
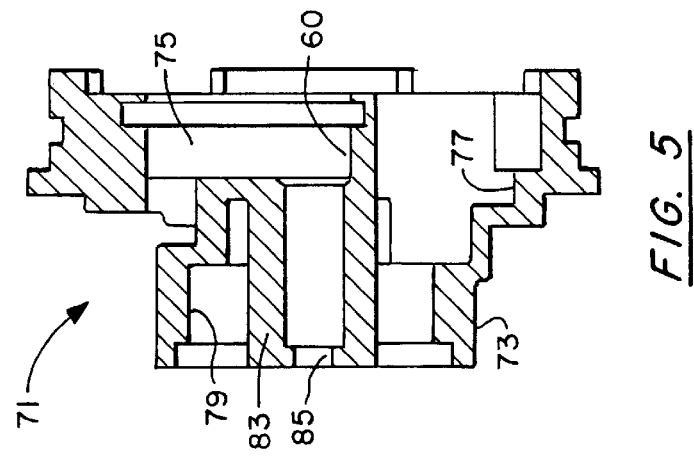
FIG. 5 is a sectional view of the adapter of FIG. 4 taken along the line 5—5 thereof.
Figure 4:
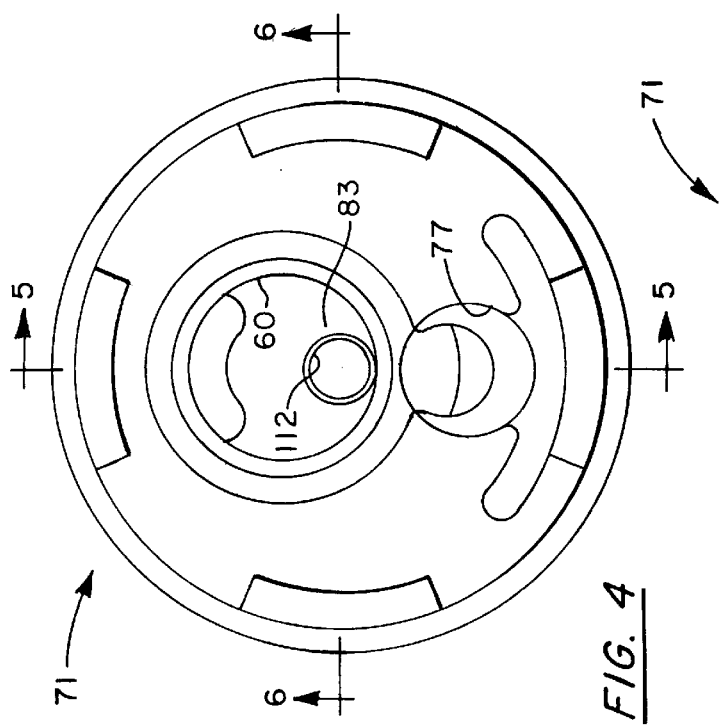
FIG. 4 is a top plan view of an adapter employed in the fuel filter assembly base of FIG. 3.
Figure 6:
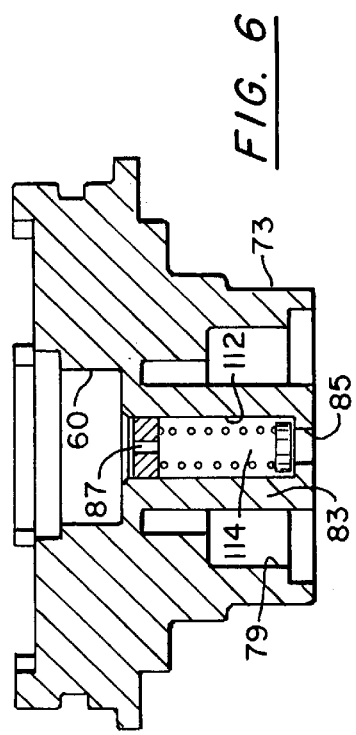
FIG. 6 is a sectional view of the adapter of FIG. 4, together with a pressure regulator, taken along the line 6—6 thereof.

With additional reference to FIGS. 4–6, the fuel flow path between the filter assembly header and the pump is defined by an adapter 71. The adapter 71 is positioned at the upper central portion of the filter header. The lower exterior recessed surface 73 of the adapter partially forms annulus 58 which communicates via a transverse passage 75 with the central connecting passage 60 which communicates axially with the central portion of the pump 20. The pressurized fuel from the pump is conducted via a passage 77 to an inwardly defined annulus 79 for communication with the conduit 50. Conduit 50 at the upstream dirty side of the filter functions as the inlet passageway to the filter cartridge. The adapter seals with the pump housing and the header by means of O-rings 81, 88 and 89. The adapter forms an axial sleeve 83 having opposed control orifices 85 and 87. A spring loaded pressure regulator 114 functions as a diverter or by-pass valve.

The fuel is pressurized upstream from the filter cartridge and supplied via annulus 79 to the conduit 50. The spring loaded by-pass valve 114 diverts the fuel to the axial passage 112 to the pump inlet if the pressure exceeds a threshold defined by the spring force, such as, for example, 8 p.s.i.

With reference to FIG. 7, an alternate lift pump unit 118 comprises a cylindrical housing 134 which is secured to the base 12 by a separate lock ring 23. The housing encloses a solenoid operated pump 120. The pump 120 includes a solenoid coil 102 which is energized to reciprocate a central plunger 104. The plunger is disposed in a brass tube 106. The tube 106 coaxially aligns and integrally connects with the central conduit 50. A distal check valve 121 is fixed in an interior sleeve 108 of the tube. A bumper 122 is disposed above the check valve. The bumper limits the travel of the plunger during the pressure stroke. The solenoid coil 102 is mounted on a bobbin 124. The bobbin 124 has a plurality of openings which define a flow path from the upper cavity axially around the solenoid coil down through the central tube 106. In some embodiments insulating material is applied to the coil because of the contact of the fuel path and the coil.

The reciprocating plunger 104 creates a sufficient suction head to pump the fuel in the axial path to the conduit 50. A second check valve 128 is disposed at the end of the plunger chamber to provide a one-way control for the passage of pressurized fluid to the conduit 50. The check valve 128 preferably is a spring rubber disk-type configuration. When the plunger moves in an upward stroke, the check valve closes and fuel fills the pumping chamber and plunger. The pressurized fuel is then forced through the check valve 128 to the conduit 50.

A spring 130 disposed at the upper central interior portion of the lift pump housing is responsive to the fluid pressure. The position of the spring is sensed by an inductance circuit of an electronics package 132 at the top of the pump housing 134. When the fluid pressure is below a threshold, the circuit energizes the coil to maintain the pump in an energized state. The electronics package 132 is disposed in an envelope which is mounted at the upper portion of the lift pump housing. Leads 136 extend through the cover 138 and connect to the voltage source 29 and switches 30 or 32. The fuel flow path through the housing unit is defined by the FIG. 7 arrows.

With reference to FIG. 8, a third embodiment of the lift pump unit is generally designated by the numeral 218. Lift pump 218 comprises a transversely symmetric housing which allows a rotary vane-type electric pump 220 to be disposed in a generally horizontal orientation. The pump housing 250 has a generally T-shaped configuration. An O-ring 252 seals the pump with the housing 250 to partially define the flow path indicated by the arrows in FIG. 8. The pump unit electrically connects via terminals 254 extending through one end of the housing. A connector sleeve 258 of the housing is secured to the filter header by a lock ring 23. A pair of axial passages 257 and 259 extend through the sleeve. An adapter assembly 260 defines the fuel flow path between the filter header and the passages 257 and 259. A pressure regulator 262 comprising a valve 264 and spring 266 is disposed in the sleeve in a transverse orientation for controlling fuel flow through the pump housing and providing a diverter or by-pass path 268 between the passages 257 and 259 if the pressure exceeds a threshold pressure defined by spring 266. The fuel generally flows through passage 257 at one side of the housing sleeve 258 to the pump where it is pressurized and returned through passage 259 at the other side of the sleeve 258 for communication through the conduit 50. Pump unit 218 satisfies certain headroom constraints more effectively than embodiments 18 and 118 for some applications.

Figure 10:
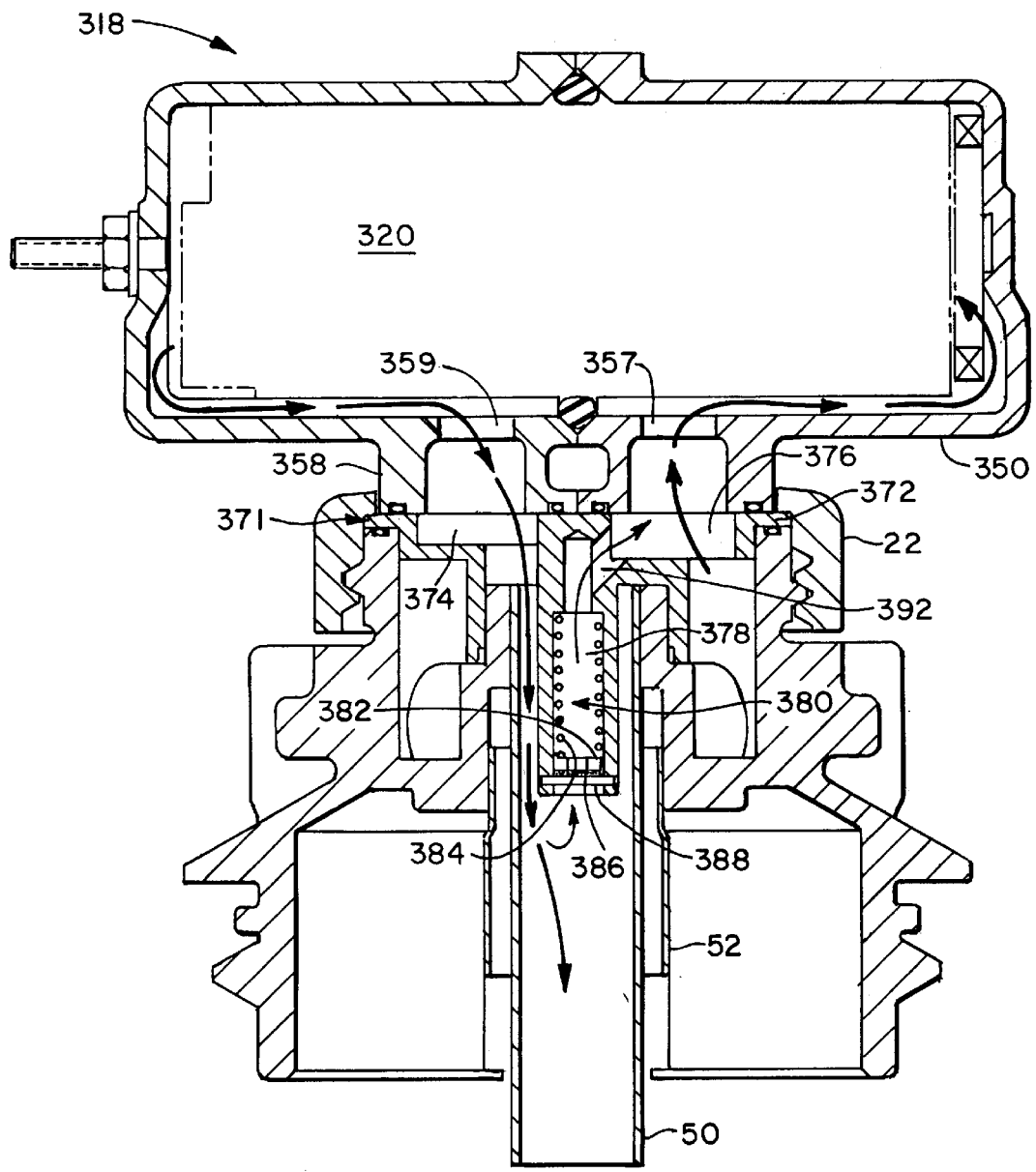
FIG. 10 is an enlarged elevational view, partly in section and partly in schematic, illustrating a fourth embodiment of a filter assembly base and lift pump for a first flow path configuration in accordance with the invention.
Figure 11:
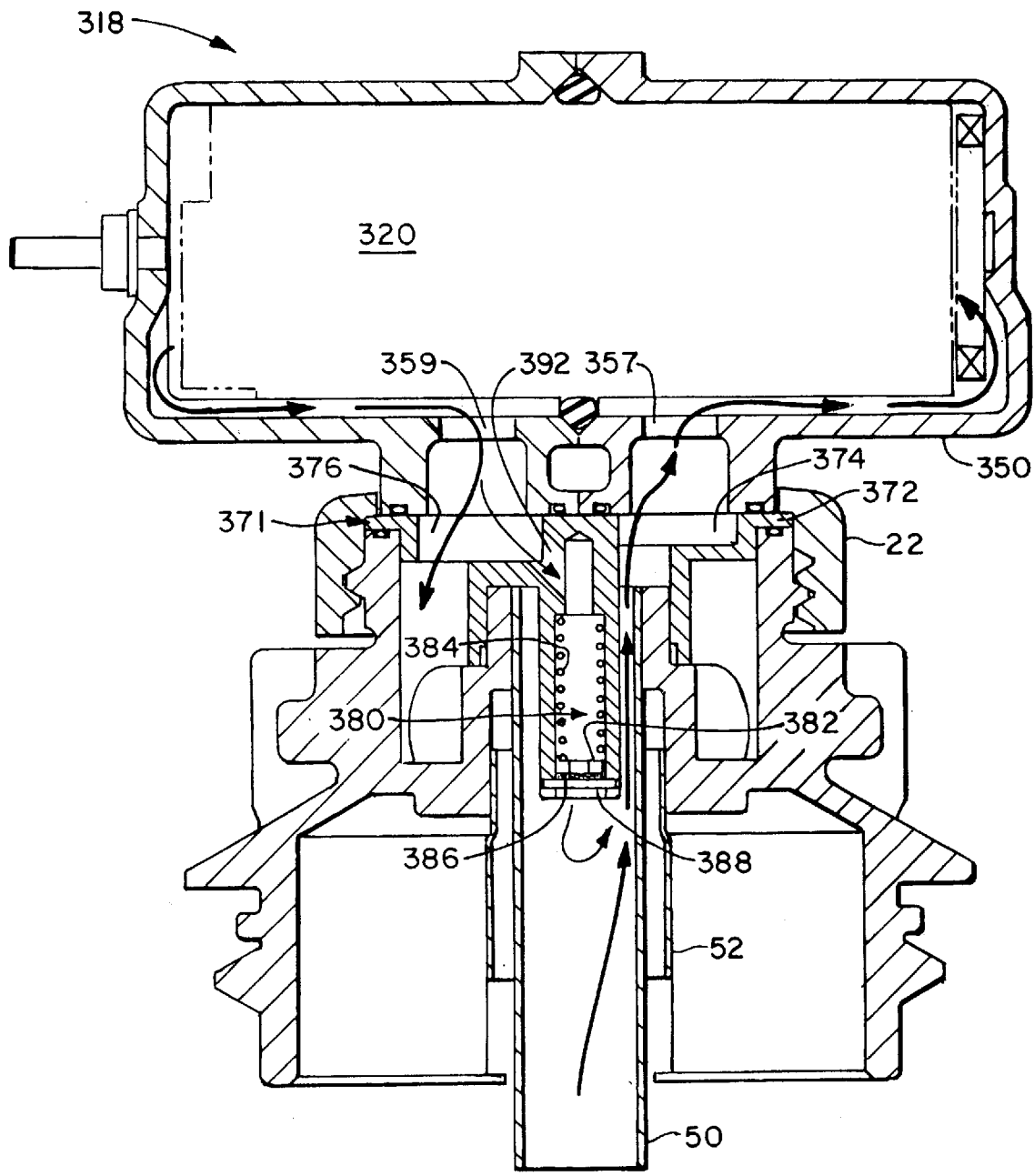
FIG. 11 is an enlarged elevational view, partly in section and partly in schematic, of the embodiment of FIG. 11, illustrating a second flow path configuration.
Figure 12:
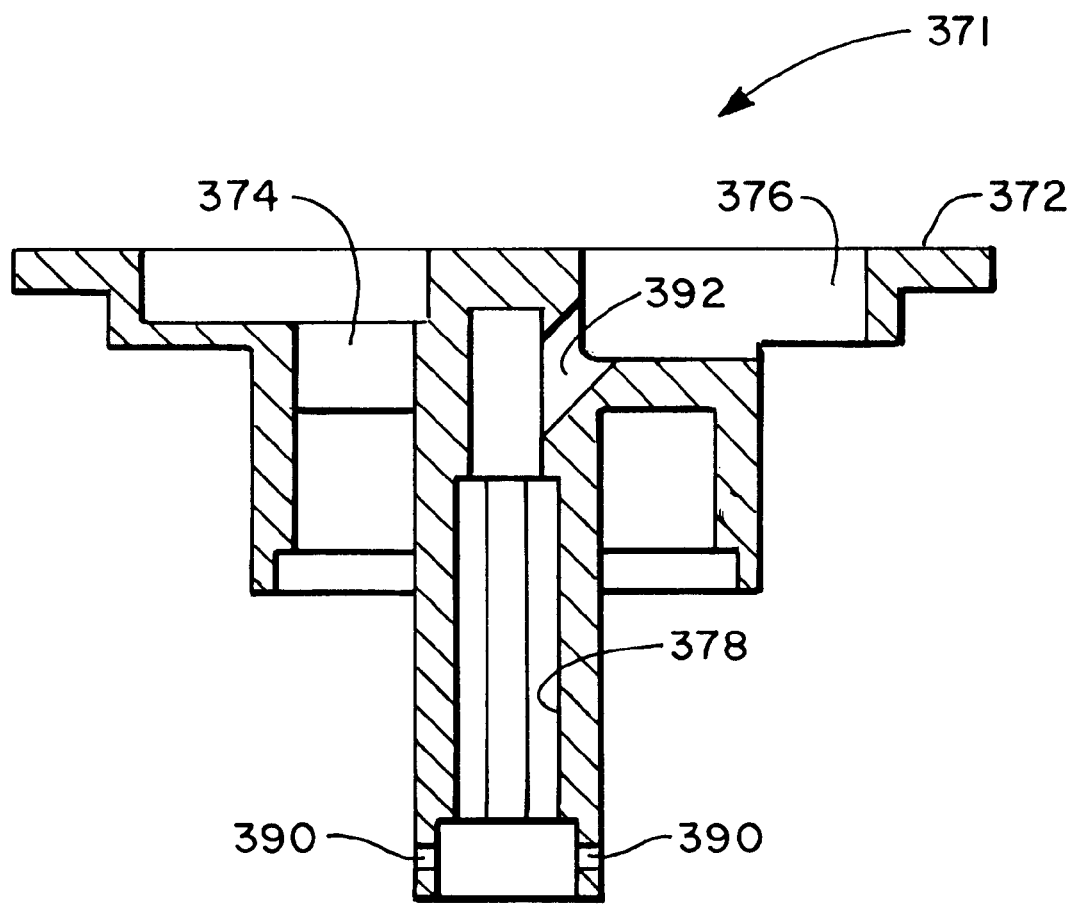
FIG. 12 is an enlarged sectional view of an adapter employed in the configurations of FIGS. 10 and 11.

With reference to FIGS. 10 and 11, a fourth embodiment of a lift pump unit is generally designated by the numeral 318. The lift pump 318 comprises a transversely symmetric housing which is generally similar to that of FIG. 8. The filter header, however, is configured so that the flow sequence between the filter and the pump may be selected at the time of installation by merely positioning an adapter 371 (FIG. 12) at one of two 180° opposite angular orientations about the central vertical axis.

The adapter 371 mates with the filter header and the housing sleeve to define the flow sequence. The adapter 371 is a stepped component having a circumferential lip 372 which is disposed between the lower end of the pump housing sleeve 358 and the top of the header and is retained by the retainer ring 22. The adapter defines two isolated passages 374, 376 which respectively communicate with conduit 50 and with either the inlet to the header or the outlet which communicates with conduit 52 depending on the angular position of the passage 376 about the central vertical axis of FIGS. 10–12. As illustrated in FIG. 10, passage 376 provides communication between the inlet chamber 54 (FIG. 7) and the pump inlet passage 357 to divert fuel to the pump 320. Passage 374 provides communication of pressurized fuel from the pump outlet passage 359 to the conduit 50 for flow to the cartridge.

For the normal flow, wherein fluid entering the filter header is first diverted to the pump 320, as schematically illustrated in FIG. 10, the pressurized fuel flows in the direction of the arrow through the central conduit 50 to the filter cartridge (not illustrated). The generally T-shaped housing 350 partially defines the flow path from the filter header to the pump and back to the header. The housing includes a sleeve 358 which defines the generally axial pump inlet passage 357 and the generally axial pump outlet passage 359.

The pressure within the filter assembly is regulated by the pressure regulator designated generally by the numeral 380. The pressure regulator 380 is mounted in a central stepped bore 378 of the adapter. The pressure regulator includes a pintle valve 382 which is mounted in the enlarged counterbore of the adapter. The valve is biased by a spring 384 which establishes the opening pressure of the valve. A rubber disk 386 is mounted in the lower throat of the adapter bore and retained in position by a pin 388 which is secured in diametrically opposing openings 390 at the lower end of the adapter. When the pressure at the outlet end of the pump exceeds the pre-established threshold pressure established by the spring 384, the valve lifts to provide an axial relief passage upwardly through the bore of the adapter and through a diagonal outlet passage 392 for return via passage 376 and 357 to the suction end of the pump.

With reference to FIG. 11, the fuel flow is reversed through the filter assembly by rotating the adapter 180° and reversing the pintle valve 382 of the pressure regulator 350. As illustrated in the drawing, the fuel flow through the filter assembly flows in a reverse direction through the annulus between conduits 50 and 52 from the exterior of the filter element 42 radially inwardly for outlet through the central conduit 50. The fuel flows axially up through the conduit 50 through the adapter passage 374 and passage 357 to the suction end of the pump. Pressurized fuel from the pump is then supplied through the axial passage 376 of the adapter to the annulus for flow through the filter element in the direction generally reverse to that of the FIG. 10 configuration.

The pintle valve 382 is also reversed and mounted in the adapter bore so that the valve face opens the axial passage through bore 378 when the pressure of the pressurized fuel supplied in the diagonal passage 392 exceeds the pre-established threshold pressure defined by the spring 384. The fuel then axially flows downwardly (for the illustrated configuration) through the axial bore 378 from where it is returned to the suction end of the pump via the upper portion of the conduit 50 and the axial passage 374 of the adapter as illustrated in FIG. 11. The pressure regulator valve assembly is retained in position in the same manner as described for the FIG. 10 configuration.

It will be appreciated that the filter assembly pump units as illustrated in FIGS. 10 and 11 provide a bi-directional modularity for the pump/filter sequence which allows for selection and implementation of the desired configuration at the time of installation. For example, for a secondary fuel filter assembly 11, it may be desirable to reverse the filter/pump sequence of the primary filter assembly 10. A particular feature of the embodiment is that same components may be used to implement either pump/filter flow sequence and the sequence may be efficiently reversed by rotating the adapter 371 180° and reversing the components of the valve regulator 380.

In embodiments wherein the lift pump is not required, the pump unit 18, 118, 218, 318 may be omitted and replaced by a cap assembly 90 (FIG. 9) which provides an upper seal of the passage 60 and completes the fuel flow path from the fuel inlet passage 54 through conduit 50, the filter cartridge, conduit 52 and outlet passage 56.

In an alternate embodiment, the lift pump may take the form of an automatic hand-type primer which initiates pressurization upon turning on the ignition switch. The pumping action continues for a pre-established period until the pressure reaches a pre-established threshold at which point the primer pump ceases.

The lift pump units 18, 118, 218, 318 may be mounted to the filter assembly at the option of the original equipment manufacturer or according to the specific application while other applications may employ a conventional hand primer assembly or may essentially include a cap assembly 90 without a hand primer or a lift pump. All of these configurations may employ the same filter base or header 12.

While preferred embodiments have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fluid filter assembly comprising:
   base means for forming a base having an inlet, an outlet and cartridge receptacle means for receiving a filter cartridge;
   pump means for pumping fluid;
   mounting means for mounting said pump means to said base means;
   communication means for providing fluid communication between said inlet and said outlet via said pump means and a filter cartridge received by said receptacle means comprising an adapter which when positioned at a first angular position defines a fluid path from said inlet to said pump means to said filter cartridge to said outlet and when positioned in a second position defines a fluid path which extends from said inlet to said filter cartridge to said pump means to said outlet; and
   sensor means for sensing fluid pressure within said filter assembly.

2. The filter assembly of claim 1 wherein said pump means comprises a housing having a peripheral mounting flange.

3. The filter assembly of claim 1 wherein said mounting means comprises a lock ring threadably mounted to said base means.

4. The filter assembly of claim 1 wherein said pump means comprises a pump selected from the group consisting of a vane-type pump and a gerotor pump.

5. The filter assembly of claim 1 further comprising control means for controlling said pump means in response to said sensor means.

6. The filter assembly of claim 1 wherein said sensor means comprises a spring and a circuit means responsive to the position of said spring for detecting the pressure exerted against said spring.

7. The filter assembly of claim 1 further comprising pressure regulator means for regulating the pressure of fluid supplied to a filter cartridge.

8. The filter assembly of claim 1 wherein said pump means is electrically powered.

9. The filter assembly of claim 8 further comprising switch means remote from said base means and said pump means for activating said pump means.

10. The fluid filter of claim 1 wherein said angular positions are 180° apart.

11. The fuel filter of claim 1 wherein said adapter further defines an axial passage and further comprising pressure regulator means mounted in said passage for diverting the flow of fluid when said fluid pressure exceeds a pre-established threshold.

12. The fluid filter assembly of claim 11 wherein said pressure regulator means further comprises a valve and a spring biasing the valve to a closed position.

13. A modular fuel filter assembly comprising:
   base means for forming a base having an inlet, an outlet and cartridge receptacle means;
   cartridge means comprising filter means for filtering fuel removably receivable by said receptacle means;
   pump means for pumping fuel;
   mounting means for selectively mounting said pump means to said base means;

communication means for providing fuel communication between said inlet and said outlet via said pump means and said cartridge means comprising an adapter which when positioned at a first angular position defines a fluid path from said inlet to said pump means to a filter cartridge to said outlet and when positioned in a second position defines a fluid path which extends from said inlet to said filter cartridge to said pump means to said outlet; and by-pass valve means for changing the flow of fuel to by-pass said filter means when fuel pressure exceeds a threshold pressure.

14. The fuel filter assembly of claim 13 wherein said pump means comprises a housing having a peripheral mounting flange.

15. The fuel filter assembly of claim 13 wherein said mounting means comprises a lock ring threadably mounted to said base means.

16. The fuel filter assembly of claim 13 wherein said pump means comprises a pump selected from the group consisting of a rotary vane-type pump and a gerotor pump.

17. The fuel filter assembly of claim 13 wherein said communication means defines a communication path and further comprising sensor means for sensing fluid pressure in said communication path between said inlet and said pump means within said filter assembly.

18. The fuel filter assembly of claim 17 further comprising control means for controlling said pump means in response to said sensor means.

19. The fuel filter assembly of claim 18 wherein said sensing means comprises a spring and an inductance circuit means responsive to the position of said spring for detecting the pressure exerted against said spring.

20. The fuel filter assembly of claim 13 wherein said cartridge means and said pump means are disposed in generally opposite relationship to said base means.

21. The fuel filter assembly of claim 13 wherein said pump means comprises a generally T-shaped housing.

22. The fuel filter of claim 13 wherein said angular positions are 180° apart.

23. The fuel filter of claim 13 wherein said adapter further defines an axial passage and further comprising pressure regulator means mounted in said passage for diverting the flow of fuel when said fuel pressure exceeds a pre-established threshold.

24. The fuel filter assembly of claim 22 wherein said pressure regulator means further comprises valve means and spring means for biasing the valve to a closed position.

25. A method for providing a transfer pressure to supply fuel from a fuel reservoir to a fuel filter assembly having a base and a filter, the base having a flow reversing adapter for selectively reversing flow through said filter assembly, the method comprising:

(a) mounting a pump to said base;

(b) supplying fuel to said pump;

(c) selecting a flow path through said filter assembly by positioning said adapter wherein the fuel is pressurized by said pump either before the fuel flows through said filter or after the fuel flows through said filter:

(d) operating said pump to pressurize fuel;

(e) sensing the pressure of said fuel;

(f) controlling the operation of the pump in response to the pressure; and (g) passing said fuel through said filter.

26. The method of claim 25 further comprising diverting fuel from said filter when the pressure of the fuel exceeds a pre-established threshold.

27. The method of claim 25 further comprising activating said pump from a location remote from said filter assembly.

* * * * *